US009276422B2

(12) United States Patent
Hotta

(10) Patent No.: US 9,276,422 B2
(45) Date of Patent: Mar. 1, 2016

(54) BATTERY PACK AND ELECTRIC POWER CONSUMING APPARATUS

(75) Inventor: Shin Hotta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 223 days.

(21) Appl. No.: 13/980,175

(22) PCT Filed: Jan. 17, 2012

(86) PCT No.: PCT/JP2012/050814
§ 371 (c)(1),
(2), (4) Date: Jul. 17, 2013

(87) PCT Pub. No.: WO2012/102128
PCT Pub. Date: Aug. 2, 2012

(65) Prior Publication Data
US 2013/0300370 A1    Nov. 14, 2013

(30) Foreign Application Priority Data

Jan. 26, 2011  (JP) ................................. 2011-013851

(51) Int. Cl.
| H02J 7/00 | (2006.01) |
| H01M 10/42 | (2006.01) |
| H01M 10/44 | (2006.01) |
| H01M 10/48 | (2006.01) |

(52) U.S. Cl.
CPC ........... *H02J 7/0031* (2013.01); *H01M 10/425* (2013.01); *H01M 10/441* (2013.01); *H01M 10/482* (2013.01); *H02J 7/0024* (2013.01); *Y02T 10/7055* (2013.01)

(58) Field of Classification Search
CPC ............ H01M 10/441; H01M 10/482; H01M 10/4207; H02J 7/0031; H02J 7/0024
See application file for complete search history.

(56) References Cited

U.S. PATENT DOCUMENTS

| 5,744,936 A | 4/1998 | Kawakami |
| 2001/0000212 A1* | 4/2001 | Reipur et al. .................. 320/104 |

(Continued)

FOREIGN PATENT DOCUMENTS

| JP | 06-283210 A | 10/1994 |
| JP | 2001-309563 A | 11/2001 |

(Continued)

OTHER PUBLICATIONS

International Search Report prepared by the Japanese Patent Office on Apr. 24, 2012, for International Application No. PCT/JP2012/050814.

*Primary Examiner* — Vuthe Siek
*Assistant Examiner* — Aric Lin
(74) *Attorney, Agent, or Firm* — Sheridan Ross P.C.

(57) ABSTRACT

A battery pack that has a configuration in which a plurality of secondary battery cells are connected in series at time of discharge and are connected in parallel at time of charge, and that has a configuration and a structure with which the charge and the discharge are allowed to be performed without any trouble even if an abnormal-state secondary battery cell exists is provided. A battery pack 10 includes a plurality of secondary battery cells 21 and a control circuit 11. Under control of the control circuit 11, the plurality of secondary battery cells 21 are connected in series at time of discharge, and are connected in parallel at time of charge. The control circuit 11 measures voltages of the respective secondary battery cells 21 before the charge, and in a state that a secondary battery cell 21 having a value of measured voltage equal to or less than a predetermined value as an abnormal-state secondary battery cell is electrically disconnected from other secondary battery cells 21 in the plurality of secondary battery cells 21, the control circuit 11 connects the other secondary battery cells 21 in parallel and charges the other secondary battery cells 21.

11 Claims, 14 Drawing Sheets

(56) References Cited

U.S. PATENT DOCUMENTS

2008/0203976 A1* 8/2008 Ooishi et al. .................. 320/162
2010/0072950 A1* 3/2010 Tatebayashi et al. ......... 320/134

FOREIGN PATENT DOCUMENTS

| JP | 2001309563 A | * | 11/2001 | ................ H02J 7/00 |
| JP | 2007-053838 A | | 3/2007 | |

* cited by examiner

BATTERY PACK AND ELECTRIC POWER CONSUMING APPARATUS

CROSS REFERENCE TO RELATED APPLICATIONS

This application is a national stage application under 35 U.S.C. 371 and claims the benefit of PCT Application No. PCT/JP2012/050814 having an international filing date of Jan. 17, 2012, which designated the United States, and which PCT application claimed the benefit of Japanese Patent Application No. 2011-013851 filed on Jan. 26, 2011, the disclosure of which is incorporated herein by reference.

TECHNICAL FIELD

The present disclosure relates to a battery pack and to an electric power consuming apparatus.

BACKGROUND ART

In a battery pack (battery module) configured of a plurality of secondary battery cells connected in series, in some cases, states of charge (SOC) may be different between the respective secondary battery cells due to unbalanced temperature distribution and unbalanced self-discharge. Such a state is called "disruption of cell balance." In the case where the disruption of cell balance occurs, for example, a state that while one secondary battery cell is in a state of full charge, another secondary battery cell is not sufficiently charged occurs. When charge is continued in such a state, the secondary battery cell in a state of full charge is overcharged, and liquid leakage, heat generation, and/or the like may occur therein. Therefore, control is executed so that the secondary battery cell in a state of full charge is not charged any further. However, in this case, the capacity of the secondary battery cell not sufficiently charged yet is not used maximally. On the other hand, at the time of discharge, when the capacity of the secondary battery cell not sufficiently charged yet is used up, part of the capacity of the secondary battery cell that has been in a state of full charge remains. Therefore, the capacity of the secondary battery cell that has been in a state of full charge is not used up as well.

To solve the foregoing issue, in the technology disclosed in Japanese Unexamined Patent Application Publication No. 2009-261168, at the time other than discharge, connection of respective secondary battery cells is switched to parallel connection to prevent respective SOCs from being unbalanced. Further, in the technology disclosed in Japanese Unexamined Patent Application Publication No. 2008-278635 (JP2008-278635A), secondary battery cells are connected in series at the time of discharge, and the secondary battery cells are firstly connected in series and are subsequently switched to be connected in parallel at the time of charge. Further, in the technology disclosed in JP2008-278635A, in order to prevent charge time from being increased at the time of parallel connection, series connection is maintained at the time of CC charge, and the series connection is switched to parallel connection when the CC charge is shifted to CV charge.

CITATION LIST

Patent Literatures

[Patent Literature 1]: Japanese Unexamined Patent Application Publication No. 2009-261168

[Patent Literature 2]: Japanese Unexamined Patent Application Publication No. 2008-278635

SUMMARY OF INVENTION

However, in the technologies disclosed in Patent Literatures 1 and 2, in the case where an abnormal state occurs in, for example, one of the secondary battery cells in a battery pack, specifically, in the case where internal short-circuit occurs in one secondary battery cell, the following problem occurs. That is, since the secondary battery cells are connected in series at the time of discharge, the total voltage is decreased only by the amount of the one secondary battery cell compared to that at the time of normal state, which does not lead to serious problem. If heat is generated when applying a current to the abnormal-state secondary battery cell, such an incident is detected before charge and the battery pack is in an unusable state. Therefore, a dangerous state is avoidable. However, when the respective secondary batteries are connected in parallel at the time of charge, a large current flows all together from the other normal secondary battery cells to the abnormal-state secondary battery cell. As a result, heat is drastically generated in the abnormal-state secondary battery cell. In general, at the moment of becoming such a state, a circuit is cut by a fuse and/or a PCT (Positive Temperature Coefficient) included in the secondary battery cell. In the case where the circuit is cut as above, although drastic heat generation is avoided, charge and discharge in the battery pack are not allowed to be performed thereafter. Such a state prevents effective use of resources. In addition thereto, for example, such a state may lead to lowered driving performance in the case where the battery pack is used for, for example, an electric vehicle or the like.

Therefore, it is an object of the present disclosure to provide a battery pack that has a configuration in which a plurality of secondary battery cells are connected in series at the time of discharge and are connected in parallel at the time of charge, and that has a configuration and a structure that allow charge and discharge without any trouble even if an abnormal-state secondary battery cell exists. Further, it is also an object of the present disclosure to provide an electric power consuming apparatus including the battery pack.

A battery pack according to a first embodiment of the present disclosure to achieve the foregoing object is a battery pack including: a plurality of secondary battery cells; and a control circuit. Under control of the control circuit, the plurality of secondary battery cells are connected in series at time of discharge, and are connected in parallel at time of charge. The control circuit measures voltages of the respective secondary battery cells before the charge, and in a state that a secondary battery cell having a value of measured voltage equal to or less than a predetermined value as an abnormal-state secondary battery cell is electrically disconnected from other secondary battery cells in the plurality of secondary battery cells, the control circuit connects the other secondary battery cells in parallel and charges the other secondary battery cells.

A battery pack according to a second embodiment of the present disclosure to achieve the foregoing object is a battery pack including: a plurality of secondary battery cells; and a control circuit. Under control of the control circuit, the plurality of secondary battery cells are connected in series at time of discharge, and are connected in parallel at time of charge. The control circuit measures voltages of the respective secondary battery cells every time when the discharge is discontinued, and stores the measured voltages in a memory device included in the control circuit. In a state that a secondary battery cell having a value of the measured and stored voltage equal to or less than a predetermined value as an abnormal-state secondary battery cell is electrically disconnected from other secondary battery cells in the plurality of secondary battery cells, the control circuit connects the other secondary battery cells in parallel and charges the other secondary battery cells.

A battery pack according to a third embodiment of the present disclosure to achieve the foregoing object is a battery pack including: a plurality of secondary battery cells; and a control circuit. Under control of the control circuit, the plurality of secondary battery cells are connected in series at time of discharge, and are connected in parallel at time of charge. The control circuit connects the secondary battery cells in series and charges the secondary battery cells until each electric power amount thereof reaches a predetermined electric power amount, and subsequently measures a voltage of the secondary battery cells connected in series. When a value of the measured voltage of the secondary battery cells connected in series exceeds a first predetermined value, the control circuit switches connection of the secondary battery cells to parallel connection, charges the secondary battery cells, and completes the charge. When the value of the measured voltage of the secondary battery cells connected in series is equal to or less than the first predetermined value, the control circuit measures voltages of the respective secondary battery cells, and in a state that a secondary battery cell having the value of the measured voltage equal to or less than a second predetermined value as an abnormal-state secondary battery cell is electrically disconnected from other secondary battery cells in the plurality of secondary battery cells, the control circuit connects the other secondary battery cells in parallel, charges the other secondary battery cells, and completes the charge.

An electric power consuming apparatus to achieve the foregoing object includes any of the battery packs according to the first embodiment to the third embodiment of the present disclosure.

In the battery packs according to the first embodiment to the third embodiment of the present disclosure or the electric power consuming apparatus including any of these battery packs, while the secondary battery cells are connected in series at the time of discharge, in a state that the abnormal-state secondary battery cell is electrically disconnected from the other secondary battery cells, the other secondary battery cells are connected in parallel at the time of charge. Therefore, disruption of cell balance is prevented from occurring, and performance of the secondary battery cells are allowed to be sufficiently exerted. Further, when the respective secondary battery cells are connected in parallel at the time of charge, a large current is allowed to be prevented from flowing all together from the other normal secondary battery cells to the abnormal-state secondary battery cell. Further, states of charge (SOC) in the other normal secondary battery cells are allowed to be equal to each other. In addition thereto, since disruption of charge state caused by self-discharge of the secondary battery cells and variation in temperature distribution in the battery pack is corrected, a correction circuit called a cell-balance circuit is not necessitated. Further, since the secondary battery cells including the abnormal-state secondary battery cell are connected in series at the time of discharge, the total voltage is decreased only by an amount of the abnormal-state secondary battery cell compared to that in the normal state. If heat is generated when applying a current to the abnormal-state secondary battery cell, such an incident is detected before charge and the battery pack is in an unusable state, which does not lead to serious problem.

MODES FOR CARRYING OUT THE INVENTION

Figure 1:
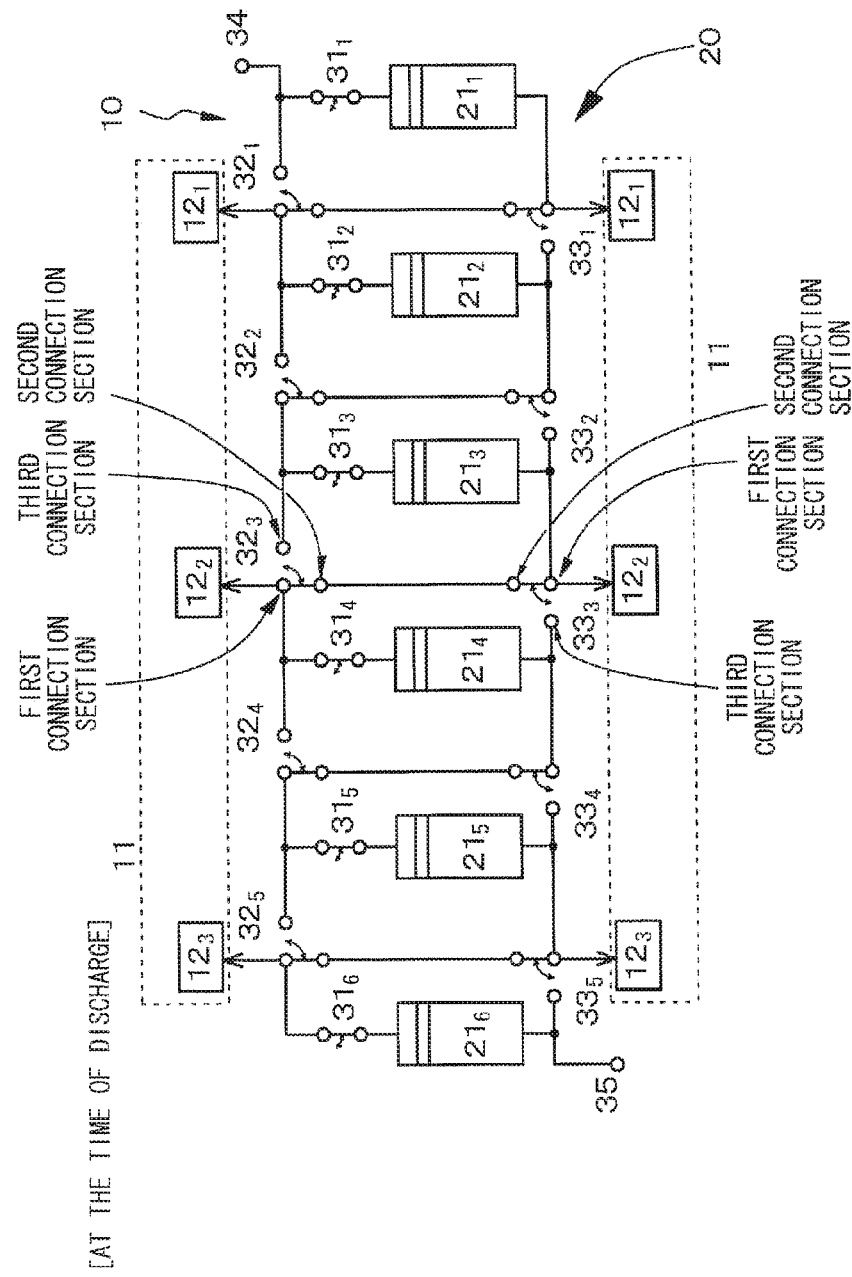
FIG. 1 is a conceptual diagram for explaining an operation of a battery pack of Example 1.
Figure 2:
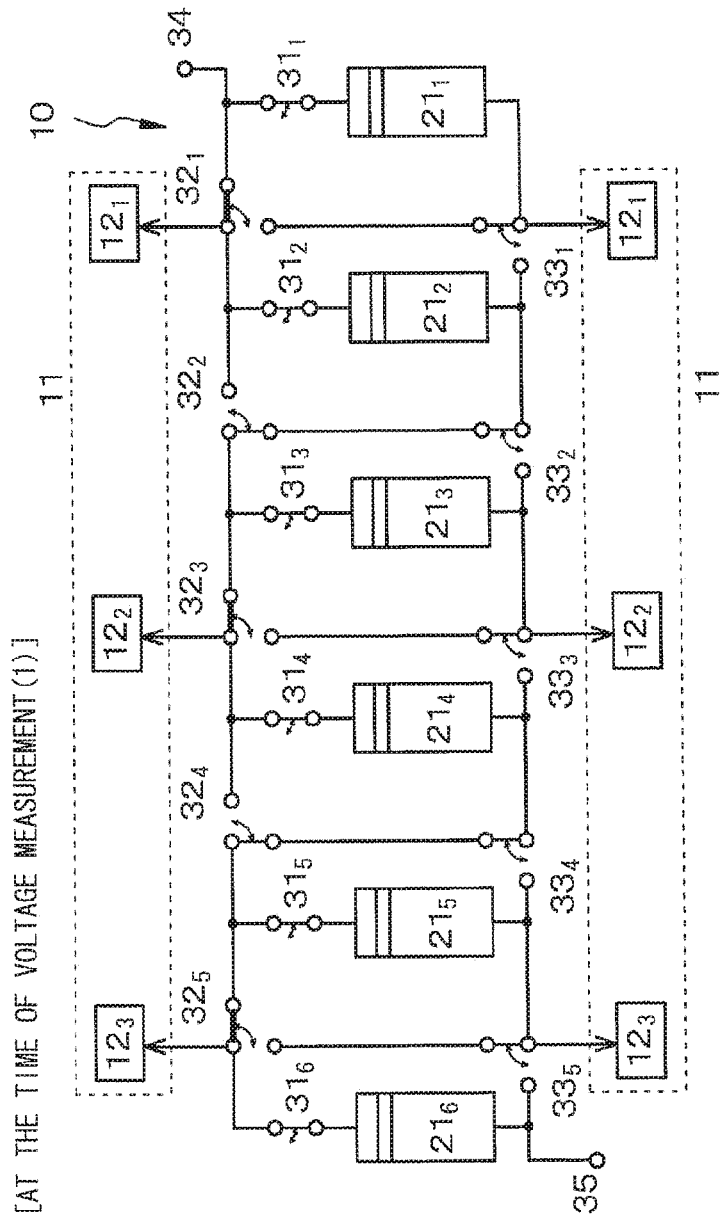
FIG. 2 is a conceptual diagram for explaining the operation of the battery pack of Example 1 following FIG. 1.

The present disclosure will be described below based on examples with reference to the drawings. However, the present disclosure is not limited to the examples, and various numerical values and various materials in the examples are merely exemplifications. The description will be given in the following order.
1. Battery Packs and Electric Power Consuming Apparatuses According to First Embodiment to Third Embodiment of Present Disclosure, and General Description
2. Example 1 (Battery Pack and Electric Power Consuming Apparatus According to First Embodiment of Present Disclosure)

3. Example 2 (Modification of Example 1)
4. Example 3 (Battery Pack and Electric Power Consuming Apparatus According to Second Embodiment of Present Disclosure)
5. Example 4 (Battery Pack and Electric Power Consuming Apparatus According to Third Embodiment of Present Disclosure) and Others Battery Packs and Electric Power Consuming Apparatuses According to First Embodiment to Third Embodiment of Present Disclosure, and General Description In battery packs according to a first embodiment to a third embodiment of the present disclosure or electric power consuming apparatuses of the present disclosure including the battery packs according to the first embodiment to the third embodiment of the present disclosure, the control circuit includes a voltage measurement device measuring the voltages of the secondary battery cells. However, it is not limitative, when number of the secondary battery cells is an even number, number of the voltage measurement device is given by a quotient obtained by dividing the number of the secondary battery cells by 2, and when the number of the secondary battery cells is an odd number, the number of the voltage measurement device is given by a value obtained by adding 1 to a quotient obtained by dividing the number of the secondary battery cells by 2.

Further, in the battery pack according to the second embodiment of the present disclosure or the electric power consuming apparatus of the present disclosure including the battery pack according to the second embodiment of the present disclosure, although not limited, a predetermined value (a predetermined voltage value in the battery pack according to the second embodiment of the present disclosure and the like) may be a nominal voltage or a voltage equal to or less than the nominal voltage (such as a value obtained by subtracting, for example, a value from 0.05 volts to 0.2 volts both inclusive from the nominal voltage).

In the battery packs according to the first embodiment to the third embodiment of the present disclosure or the electric power consuming apparatuses of the present disclosure including the battery packs according to the first embodiment to the third embodiment of the present disclosure that include the foregoing preferred forms, the control circuit discharges the secondary battery cells in a state that the abnormal-state secondary battery cell is connected in series with the other secondary battery cells. Thereby, the total voltage is decreased only by amounts of the number of abnormal-state secondary battery cell compared to in the case where all secondary battery cells are in the normal state. If heat is generated when applying a current to the abnormal-state secondary battery cell, such an incident is detected before charge, and the battery pack is in an unusable state, which does not lead to serious problem in practical use.

It is to be noted that, in the following description, in some cases, the battery pack according to the first embodiment of the present disclosure and the electric power consuming apparatus of the present disclosure including the battery pack according to the first embodiment of the present disclosure that include the foregoing preferred forms may be collectively referred to as "battery pack according to the first embodiment of the present disclosure and the like;" the battery pack according to the second embodiment of the present disclosure and the electric power consuming apparatus of the present disclosure including the battery pack according to the second embodiment of the present disclosure that include the foregoing preferred forms may be collectively referred to as "battery pack according to the second embodiment of the present disclosure and the like;" the battery pack according to the third embodiment of the present disclosure and the electric power consuming apparatus of the present disclosure including the battery pack according to the third embodiment of the present disclosure that include the foregoing preferred forms may be collectively referred to as "battery pack according to the third embodiment of the present disclosure and the like;" and the battery pack according to the first embodiment of the present disclosure, the battery pack according to the second embodiment of the present disclosure, and the battery pack according to the third embodiment of the present disclosure may be collectively and simply referred to as "battery pack of present disclosure." Further, in some cases, the battery pack according to the first embodiment of the present disclosure and the like, the battery pack according to the second embodiment of the present disclosure and the like, and the battery pack according to the third embodiment of the present disclosure and the like may be collectively and simply referred to as "present disclosure."

Examples of secondary battery cells in the present disclosure may include a lithium ion secondary battery. However, the example thereof is not limited thereto, and type of a secondary battery to be used may be selected as appropriate according to necessary characteristics. The configuration and the structure of the secondary battery cell itself may be a known configuration and a known structure. The shape of the secondary battery cell may be a known cylindrical type or a square type including a laminated type. The number (N) of the secondary battery cells configuring the battery pack of the present disclosure may be determined as appropriate based on specifications of the battery pack and specifications of an electric power consuming apparatus. As the abnormal-state secondary battery cell in the present disclosure, specifically, a secondary battery cell in which internal short-circuit occurs may be exemplified. In such a secondary battery cell, at the time of charge, the value of a flowing current is higher than that of normal secondary battery cells. The control circuit may be configured of a known circuit including an MPU, a memory device (such as a RAM, a resistor, and a nonvolatile memory such as an EEPROM), and/or the like. Further, in the present disclosure, a charge and discharge control circuit for controlling charge and discharge of the secondary battery cells is included. The charge and discharge control circuit may be configured of a known circuit including an MPU, a memory device (such as a RAM, a resistor, and a nonvolatile memory such as an EEPROM), and/or the like. The charge and discharge control circuit may include a known battery protection circuit. The battery protection circuit may be operated to stop the function of the battery pack as necessary. It is to be noted that the charge and discharge control circuit may be built into the control circuit. In order to switch between series connection and parallel connection, an appropriate switching device such as an MOSFET may be arranged between the control circuit and each of the secondary battery cells. Further, in order to electrically disconnect an abnormal-state secondary battery cell from the other secondary battery cells, an appropriate switching device such as an MOSFET may be arranged. However, such a switching device may not be necessary depending on the configuration and the structure of the battery pack. The voltage measurement devices for measuring voltages of the secondary battery cells may be configured of known circuits. An electric source of the control circuit, the charge and discharge control circuit, and the voltage measurement devices may be the secondary battery cells configuring the battery pack. In the present disclosure, in the case where the plurality of secondary battery cells that are connected in series at the time of discharge and are connected in parallel at the time of charge are configured as a secondary battery cell unit, the battery pack of the present disclosure may include one secondary battery cell unit, or may include two or more secondary battery cell units.

In the battery pack according to the first embodiment of the present disclosure and the like, the control circuit measures voltages of the respective secondary battery cells before charge. In this case, for example, the control circuit may measure OCVs (Open Circuit Voltage: a voltage measured in a state with no load in which a load is not applied to a secondary battery cell). Further, as a predetermined value in the battery pack according to the first embodiment of the present disclosure and the like (a predetermined voltage value in the battery pack according to the first embodiment of the present disclosure and the like), although not limited, a value obtained by subtracting a predetermined voltage value (for example, 0.1 volts) from a final discharge voltage may be exemplified.

Further, in the battery pack according to the second embodiment of the present disclosure and the like, the control circuit measures voltages of the respective secondary battery cells every time when discharge is discontinued. In this case, for example, the control circuit may measure OCVs. Values of the measured voltages are stored in a memory device included in the control circuit, and the latest measured voltage values may be stored in the memory device. Examples of the memory device included in the control circuit may include a known nonvolatile memory. Further, as the predetermined value in the battery pack according to the second embodiment of the present disclosure and the like (the predetermined voltage value in the battery pack according to the second embodiment of the present disclosure and the like), although not limited, a value obtained by subtracting a value from 0.05 volts to 0.2 volts both inclusive from the nominal voltage may be exemplified.

Further, in the battery pack according to the third embodiment of the present disclosure and the like, each of the secondary battery cells connected in series is charged until the electric power amount reaches a predetermined electric power amount. Here, as the predetermined electric power amount, although not limited, 80% or less (for example, 20% to 50% both inclusive) of a capacity of each of the secondary battery cells (for example, 3.6 V, 2500 mA·h=9.0 watt-hour) may be exemplified. After each of the secondary battery cells is charged until the electric power amount reaches the predetermined electric power amount, a voltage of the secondary battery cells connected in series is measured. In this case, for example, an OCV of the secondary battery cell unit may be measured. Further, as a first predetermined value, although not limited, a value obtained by subtracting a value from 0.05 volts to 0.2 volts both inclusive from a product of a value obtained by adding a voltage measurement error (for example, 0.01 volts) to the nominal voltage and the number of the secondary battery cells in series may be exemplified. Further, in the case where the measured voltage value of the secondary battery cells connected in series is equal to or less than the first predetermined value, voltages of the respective secondary battery cells are measured. In this case, for example, OCVs of the secondary battery cells may be measured. Further, as a second predetermined value, although not limited, a value obtained by subtracting a value from 0.05 volts to 0.5 volts both inclusive from the nominal voltage may be exemplified.

The battery pack of the present disclosure may be applicable to, for example, various electric power consuming apparatuses such as an electric vehicle (including a hybrid vehicle), a golf cart, an electric cart, an electric motorcycle, an electric power-assisted bicycle, a railroad vehicle, an electric power tool such as an electric drill, an electric power supply unit or a home energy server (home electric storage device), a personal computer, a mobile phone, a PDA (Personal Digital Assistance), a digital still camera, a video camera, a camcorder, an electronic book, an electronic dictionary, a music player, a radio, a headphone, a cordless phone slave unit, an electric shaver, a refrigerator, an air conditioner, a television, an image display unit, a monitor, a stereo system, a water heater, a microwave oven, a dish washer, a washing machine, a drying machine, a illumination apparatus such as an interior lamp, a game machine, a navigation system, a memory card, a pacemaker, a hearing aide, a medical device, a toy, a robot, a load conditioner, and a traffic light. The battery pack of the present disclosure may be used as a driving electric source or an auxiliary electric source of the foregoing electric power consuming apparatuses. That is, each of the electric power consuming apparatuses of the present disclosure includes one of the battery packs according to the first embodiment to the third embodiment of the present disclosure including the various preferred forms and the various preferred configurations described above. Further, the battery pack of the present disclosure may be applicable to apparatuses such as an electric source for electric power storage for buildings including a house or for a power-generation facility, may be used for supplying electric power to these apparatuses, or may be used as an electric storage device in a so-called smart grid. It is to be noted that such an electric storage device is allowed not only to supply electric power but to store electric power by being supplied with electric power from another electric source. Further, the battery pack of the present disclosure may be built into an HEMS (Home Energy Management System) or a BEMS (Building Energy Management System). As an electric source for charging the secondary battery cells configuring the battery pack, not only a commercial electric source, but also various solar cells, a fuel cell, a thermal power generation facility, a nuclear power generation facility, a hydraulic power generation facility, a wind force power generation system, a micro-hydraulic power generation system, a geothermal power generation system, and the like may be exemplified, and regenerative energy generated by an electric power consuming apparatus may be exemplified. However, examples thereof are not limited thereto.

Example 1

Example 1 relates to the battery pack according to the first embodiment of the present disclosure and the electric power consuming apparatus including the battery pack. The battery pack of Example 1 or any of battery packs of Example 2 to Example 4 described later includes a plurality of (N-number of) secondary battery cells 21 and a control circuit 11. Under the control of the control circuit 11, the plurality of secondary battery cells 21 are connected in series at the time of discharge, and are connected in parallel at the time of charge. It is to be noted that a charge and discharge control circuit is built into the control circuit 11.

As illustrated in a conceptual diagram of FIG. 1, in the illustrated example, a secondary battery cell unit 20 is configured of six secondary battery cells 21 (N=6). However, the value of N is not limited to 6. Although not limited, the secondary battery cells 21 may be configured of lithium ion secondary batteries. For example, a final charge voltage of each of the secondary battery cells 21 may be 4.2 volts, a final discharge voltage thereof may be 2.5 volts, and a nominal voltage thereof may be 3.7 volts.

In the vicinity of respective one ends (cathodes) of the respective secondary battery cells 21, switching devices (disconnection switching devices) $31_1$ to $31_6$ configured of MOSFETs for disconnecting an abnormal-state secondary battery cell from the other secondary battery cells are arranged. Further, in the secondary battery cell unit 20, in order to switch between series connection and parallel connection in the secondary battery cells 21, switching devices (second parallel-serial switching devices) $33_1$ to $33_5$ configured of MOSFETs and switching devices (first parallel-serial switching devices) $32_1$ to $32_5$ configured of MOSFETs are arranged between other ends (anodes) of the respective secondary battery cells 21 and the disconnection switching devices $31_1$ to $31_6$ arranged in the vicinity of the one ends (cathodes) of the secondary battery cells adjacent to the foregoing respective secondary battery cells 21. A secondary battery cell $21_1$ located at one end when the secondary battery cells 21 are connected in series is connected to one input-output terminal 34. Further, a secondary battery cell $21_6$ located at the other end when the secondary battery cells 21 are connected in series is connected to the other input-output terminal 35. The input-output terminals 34 and 35 are connected to an electric power consuming apparatus (not illustrated) to be supplied with electric power through an unillustrated switch, or are connected to an unillustrated device (circuit) for charging the secondary battery cells. The first parallel-serial switching devices $32_1$ to $32_5$ and the second parallel-serial switching devices $33_1$ to $33_5$ are switching devices each having three terminal sections. Respective first terminal sections of the first parallel-serial switching devices $32_1$, $31_3$, and $32_5$ and the second parallel-serial switching devices $33_1$, $32_3$, and $33_5$ are connected to voltage measurement devices $12_1$, $12_2$, and $12_3$. Further, respective second terminal sections of the first parallel-serial switching devices $32_1$ to $32_5$ and the second parallel-serial switching devices $33_1$ to $33_5$ are switching terminal sections to "series mode" that connect the one ends (cathodes) of the secondary battery cells 21 to the other ends (anodes) of the secondary battery cells 21 adjacent to the foregoing secondary battery cells 21 through the disconnection switching devices $31_1$ to $31_6$. Further, respective third terminal sections of the first parallel-serial switching devices $32_1$ to $32_5$ and the second parallel-serial switching devices $33_1$ to $33_5$ are switching terminal sections to "parallel mode" that connect the one end (cathode) of one secondary battery cell 21 to the one end (cathode) of another secondary battery cell 21 adjacent to the foregoing secondary battery cell 21, and that connect the other end (anode) of the secondary battery cell 21 to the other end (anode) of another secondary battery cell 21 adjacent to the foregoing secondary battery cell 21.

In the state illustrated in the conceptual diagram of FIG. 1, the secondary battery cells 21 are connected in series and are in a state of discharge. Specifically, the disconnection switching devices $31_1$ to $31_6$ are in "closed state." Further, the first parallel-serial switching devices $32_1$ to $32_5$ and the second parallel-serial switching devices $33_1$ to $32_5$ are in the "series mode," and the plurality of secondary battery cells 21 are connected in series.

A description will be given below of operations of a battery pack 10 of Example 1 with reference to FIG. 1 to FIG. 4.

[Operation-100]

When the control circuit 11 receives a signal to start charge from an external circuit (not illustrated), the control circuit 11 starts preparation to start charge. Further, in the case where a voltage of both ends of the second battery cell unit 20 is measured and the measured voltage value becomes a value equal to or less than the final discharge voltage, the control circuit 11 starts preparation to start charge as well. That is, the control circuit 11 measures voltages of the respective secondary battery cells 21 before charge. Specifically, as illustrated in a conceptual diagram of FIG. 2, for example, odd-numbered secondary battery cells $21_1$, $21_3$, and $21_5$ in the second battery cell unit 20 are connected to the control circuit 11. That is, while the disconnection switching devices $31_1$ to $31_6$ are kept in a "closed state," the first parallel-serial switching devices $32_1$, $32_3$, and $32_5$ are switched to the "parallel mode." Thereby, OCVs of the odd-numbered secondary battery cells $21_1$, $21_3$, and $21_5$ are allowed to be measured by the voltage measurement devices $12_1$ to $12_3$ included in the control circuit 11. The measured OCVs of the odd-numbered secondary battery cells $21_1$, $21_3$, and $21_5$ are stored in a memory device included in the control circuit 11. In this case, the voltage measurement device $12_1$ is connected to the first parallel-serial switching device $32_1$, the voltage measurement device $12_2$ is connected to the first parallel-serial switching device $32_3$, and the voltage measurement device $12_3$ is connected to the first parallel-serial switching device $32_5$.

Figure 3:
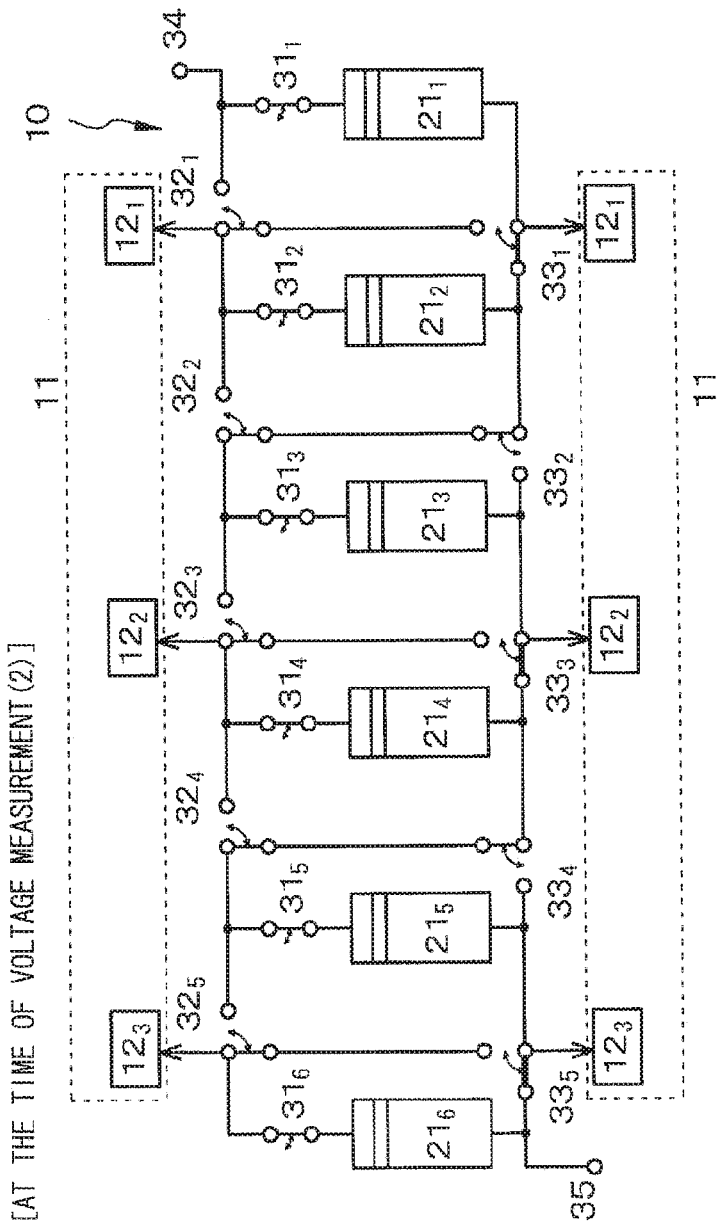
FIG. 3 is a conceptual diagram for explaining the operation of the battery pack of Example 1 following FIG. 2.

Next, as illustrated in a conceptual diagram of FIG. 3, while the disconnection switching devices $31_1$ to $31_6$ are kept in the "closed state," the first parallel-serial switching devices $32_1$, $32_3$, and $32_5$ are returned to the "series mode," and the second parallel-serial switching devices $33_1$, $33_3$, and $33_5$ are switched to the "parallel mode." Thereby, OCVs of even-numbered secondary battery cells $21_2$, $21_4$, and $21_6$ are allowed to be measured by the voltage measurement devices $12_1$ to $12_3$ included in the control circuit 11. The measured OCVs of the odd-numbered secondary battery cells $21_2$, $21_4$, and $21_6$ are stored in the memory device included in the control circuit 11.

As described above, the control circuit 11 includes the voltage measurement devices to measure the voltages of the secondary battery cells 21. As described above, in the case where the number (N) of the secondary battery cells 21 is an even number (6 in the foregoing example), the number of the voltage measurement devices is given by a quotient (3 in the foregoing example) obtained by dividing the number of the secondary battery cells by 2. In the case where the number (N) of the secondary battery cells is an odd number, the number of the voltage measurement devices is given by a value obtained by adding 1 to a quotient obtained by dividing the number of the secondary battery cells by 2.

[Operation-110]

Figure 4:
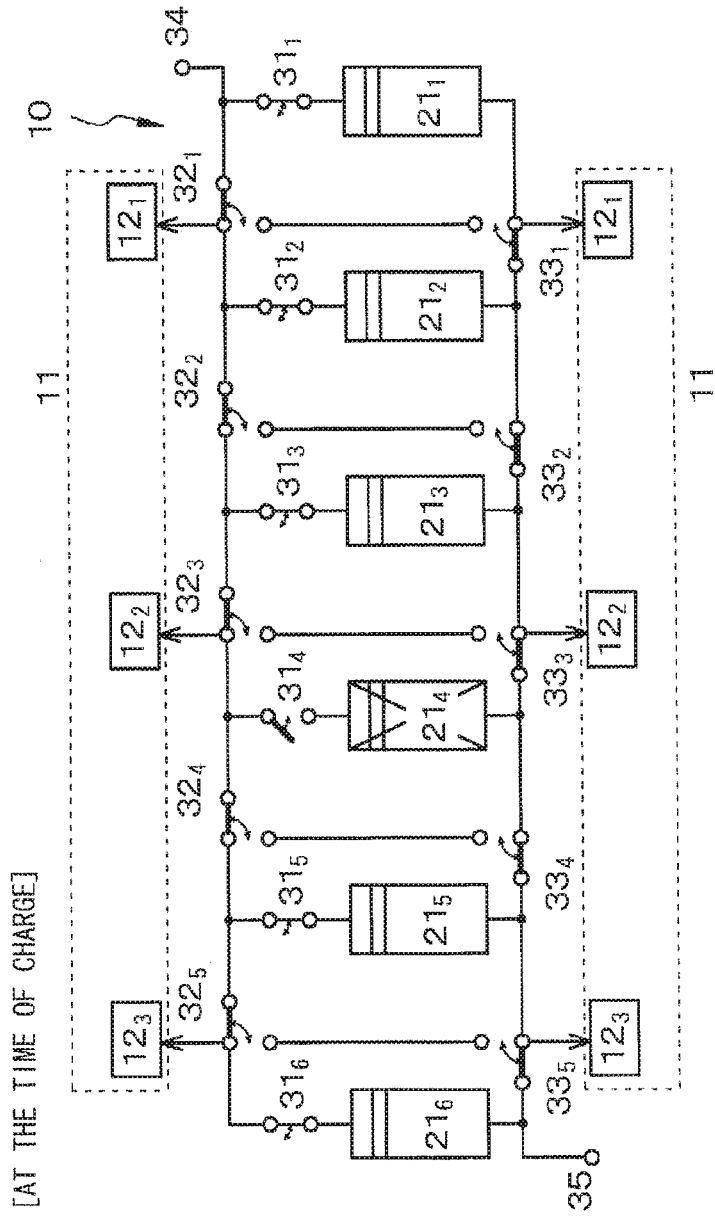
FIG. 4 is a conceptual diagram for explaining the operation of the battery pack of Example 1 following FIG. 3.

Subsequently, as illustrated in a conceptual diagram of FIG. 4, in a state that a secondary battery cell having a measured voltage value equal to or less than the predetermined value as an abnormal-state secondary battery cell is electrically disconnected from the other secondary battery cells, the other secondary battery cells are connected in parallel and are charged through the input-output terminals 34 and 35. Specifically, the control circuit 11 determines a secondary battery cell having a measured voltage value equal to or less than the predetermined value (the predetermined voltage value in the battery pack according to the first embodiment of the present disclosure and the like. For example, in the case of charge from a completely discharged state, a value obtained by subtracting 0.1 volts from the final discharge voltage, and more specifically, 2.4 volts obtained by subtracting 0.1 volts from the final discharge voltage of 2.5 volts) as an abnormal-state secondary battery cell. Subsequently, the abnormal-state secondary battery cell is electrically disconnected from the other secondary battery cells, and the other secondary battery cells are connected in parallel and are charged. It is to be noted that in the case of charge not from a completely discharged state, it is necessary to calculate an expected voltage. In this case, since the control circuit 11 previously has a discharge curve table, and includes a circuit to measure a flowing current, the expected voltage is allowed to be obtained by integrating a value of a flowing current and comparing the resultant value with a value in the table.

For example, a description will be given on the assumption that the fourth secondary battery cell $21_4$ is an abnormal-state secondary battery cell. In this case, under the control of the control circuit 11, while the disconnection switching devices $31_1$ to $31_3$ and $31_5$ to $31_6$ are kept in the "closed state," the disconnection switching device $31_4$ is turned into an "open state," and the first parallel-serial switching devices $32_1$ to $32_5$ and the second parallel-serial switching devices $33_1$ to $33_5$ are switched to the "parallel mode." Thereby, the abnormal-state secondary battery cell $21_4$ is electrically disconnected from the other secondary battery cells. Thereafter, the secondary battery cells $21_1$ to $21_3$ and $21_5$ to $21_6$ are charged based on a known method.

[Operation-120]

Next, as in the conceptual diagram of FIG. 1, after the secondary battery cells 21 are completely charged, the control circuit 11 returns the disconnection switching device $31_4$ to the "closed state," and switches the first parallel-serial switching devices $32_1$ to $32_5$ and the second parallel-serial switching devices $33_1$ to $33_5$ to the "series mode." The secondary battery cells are discharged through the input-output terminals 34 and 35 in a state that the abnormal-state secondary battery cell $21_4$ is connected in series with the other secondary battery cells $21_1$ to $21_3$, $21_5$, and $21_6$.

As described above, in Example 1, with respect to the six (N=6) secondary battery cells 21, the six disconnection switching devices 31, the five (=N−1) first parallel-serial switching devices 32, and the five (=N−1) second parallel-serial switching devices 33 configure a parallel-serial switching mechanism (system) of the secondary battery cells in the battery pack 10.

A method of charging and discharging a battery pack using the battery pack 10 of Example 1 is a method of charging and discharging a battery pack including: a plurality of secondary battery cells; and a control circuit, wherein, under control of the control circuit, the plurality of secondary battery cells are connected in series at time of discharge, and are connected in parallel at time of charge. Under, the control of the control circuit, voltages of the respective secondary battery cells are measured before the charge, and in a state that a secondary battery cell having a value of measured voltage equal to or less than a predetermined value as an abnormal-state secondary battery cell is electrically disconnected from other secondary battery cells in the plurality of secondary battery cells, the other secondary battery cells are connected in parallel and are charged.

In Example 1 or in the later-described Example 2 to Example 4, the battery pack may be applicable to electric power consuming apparatuses such as an electric vehicle (including a hybrid vehicle), a golf cart, an electric cart, an electric motorcycle, an electric power-assisted bicycle, and a railroad vehicle. That is, the electric power consuming apparatus includes the battery pack having the plurality of secondary battery cells 21. The battery pack is allowed to be discharged in order to drive a conversion device (such as a motor, specifically) included therein for converting electric power into drive force by supplying electric power, and the battery pack is allowed to be charged with the use of regenerative energy from such an electric power consuming apparatus. It is to be noted that each of the electric power consuming apparatuses may include a control device including a remaining battery power display and a control device that performs information processing of controlling the electric power consuming apparatus based on information on the secondary battery cells 21.

In the battery pack 10 of Example 1 or the electric power consuming apparatus including the battery pack, the secondary battery cells 21 are connected in series at the time of discharge. Before charge, the control circuit measures the voltages of the respective secondary battery cells. At the time of charge, in a state that the abnormal-state secondary battery cell is electrically disconnected from the other secondary battery cells, the other secondary battery cells are connected in parallel. Therefore, when the respective secondary battery cells are connected in parallel at the time of charge, a large current is prevented from flowing all together from the other normal secondary battery cells to the abnormal-state secondary battery cell. Further, since the secondary battery cells including the abnormal-state secondary battery cell are connected in series at the time of discharge, the total voltage is decreased only by an amount of the abnormal-state secondary battery cell compared to that in the normal state. If heat is generated when applying a current to the abnormal-state secondary battery cell, such an incident is detected before charge and the battery pack is in an unusable state, which does not lead to serious problem.

It is to be noted that in Example 1, the voltages of the N-number of secondary battery cells 21 are measured by the N/2-number of voltage measurement devices. Alternatively, the voltages of the N-number of secondary battery cells 21 may be measured by voltage measurement devices of the number smaller than N/2, for example, one or more voltage measurement devices by appropriate switching of the first parallel-serial switching devices $32_1$ to $32_5$ and the second parallel-serial switching devices $33_1$ to $33_5$.

Example 2

Example 2 is a modification of Example 1. In Example 2, the disconnection switching devices $31_1$ to $31_6$ are omitted. One end (cathode) of the first secondary battery cell $21_1$ and one end (cathode) of the (N−1)th secondary battery cell $21_{(N-1)}$ (in Example 2, N=6 as well) are connected to each other through a charging wiring 40. In the charging wiring 40, first charging switches $41_1$ and $41_2$ are arranged. Further, the charging wiring 40 is connected to an unillustrated device (circuit) for charging the secondary battery cells through one input terminal section 44. Further, the other end (anode) of the second secondary battery cell $21_2$ and the other end (anode) of the Nth secondary battery cell $21_N$ are connected to each other through a charging wiring 42. In the charging wiring 42, second charging switches $43_1$ and $43_2$ are arranged. Further, the charging wiring 42 is connected to an unillustrated device (circuit) for charging the secondary battery cells through the other input terminal section 45. Further, the output terminals 34 and 35 are connected to an electric power consuming apparatus (not illustrated) to be supplied with electric power.

A description will be given below of operations of a battery pack 10' of Example 2 with reference to FIG. 5 to FIG. 8.

Figure 5:
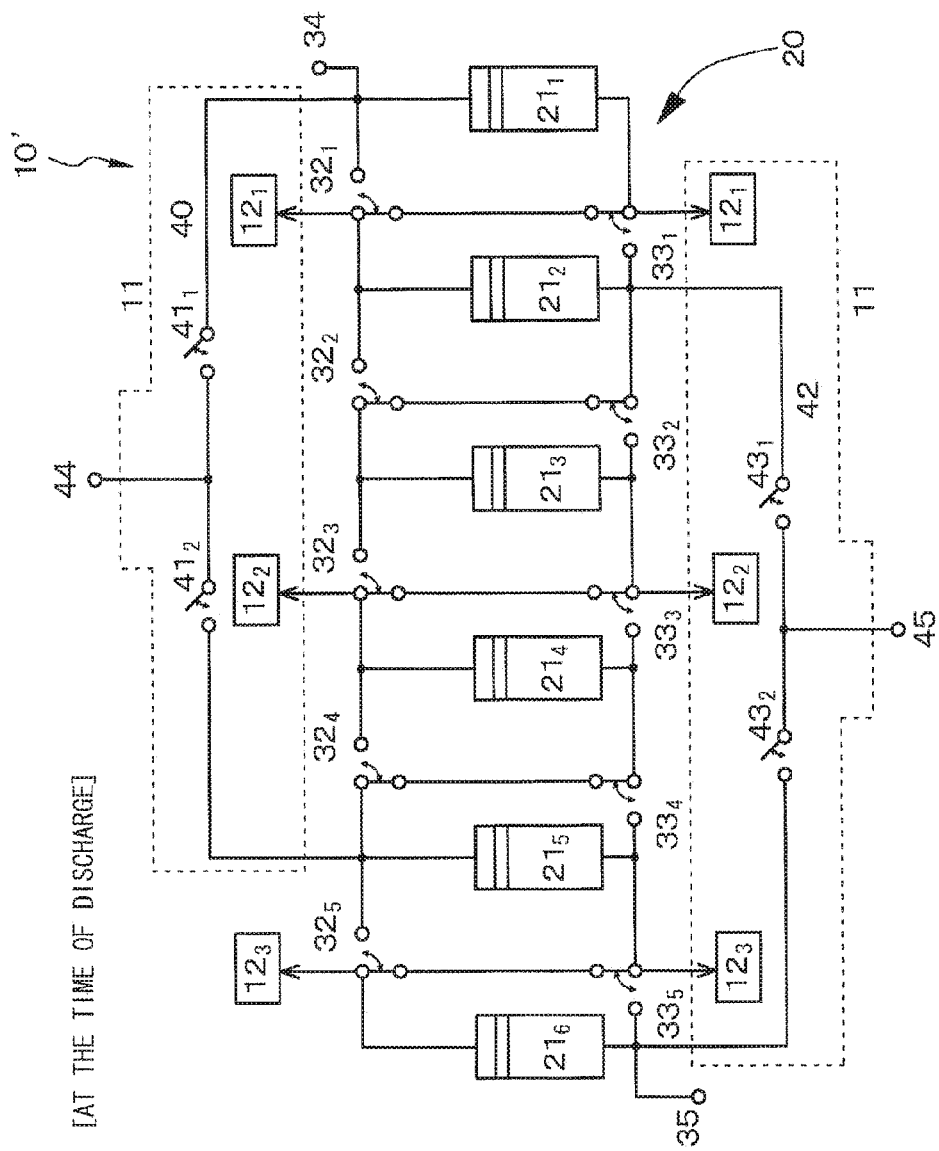
FIG. 5 is a conceptual diagram for explaining an operation of a battery pack of Example 2.
Figure 6:
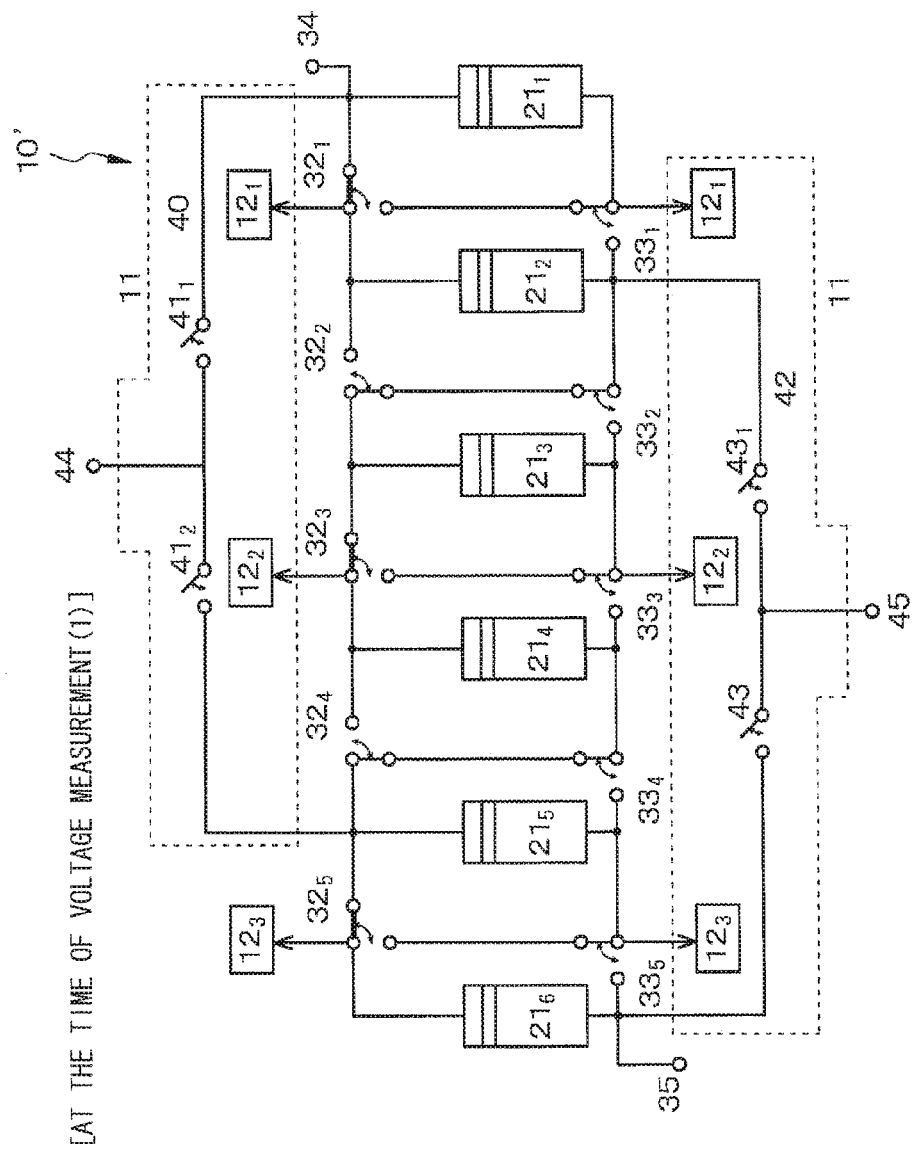
FIG. 6 is a conceptual diagram for explaining the operation of the battery pack of Example 2 following FIG. 5.

In the state illustrated in a conceptual diagram of FIG. 5, the secondary battery cells 21 are connected in series and are in a state of discharge. Specifically, charging switches $41_1$, $41_2$, $43_1$, and $43_2$ are in the "closed state." Further, the first parallel-serial switching devices $32_1$ to $32_5$ and the second parallel-serial switching devices $33_1$ to $32_5$ are in the "series mode," and the plurality of secondary battery cells 21 are connected in series.

[Operation-200]

In Example 2, as in Example 1, when the control circuit 11 receives a signal to start charge from an external circuit (not illustrated), the control circuit 11 starts preparation to start charge. Further, in the case where a voltage of both ends of the second battery cell unit 20 is measured and the measured voltage value becomes a value equal to or less than the final discharge voltage, the control circuit 11 starts preparation to start charge as well. That is, the control circuit 11 measures voltages of the respective secondary battery cells 21 before charge. Specifically, as illustrated in a conceptual diagram of FIG. 6, for example, odd-numbered secondary battery cells $21_1$, $21_3$, and $21_5$ in the second battery cell unit 20 are connected to the control circuit 11. That is, while the charging switches $41_1$, $41_2$, $43_1$, and $43_2$ are kept in the "closed state," the first parallel-serial switching devices $32_1$, $32_3$, and $32_5$ are switched to the "parallel mode." Thereby, OCVs of the odd-numbered secondary battery cells $21_1$, $21_3$, and $21_5$ are allowed to be measured by the voltage measurement devices $12_1$ to $12_3$ included in the control circuit 11. The measured values of the odd-numbered secondary battery cells $21_1$, $21_3$, and $21_5$ are stored in the memory device included in the control circuit 11. In this case, the voltage measurement device $12_1$ is connected to the first parallel-serial switching device $32_1$, the voltage measurement device $12_2$ is connected to the first parallel-serial switching device $32_3$, and the voltage measurement device $12_3$ is connected to the first parallel-serial switching device $32_5$.

Figure 7:
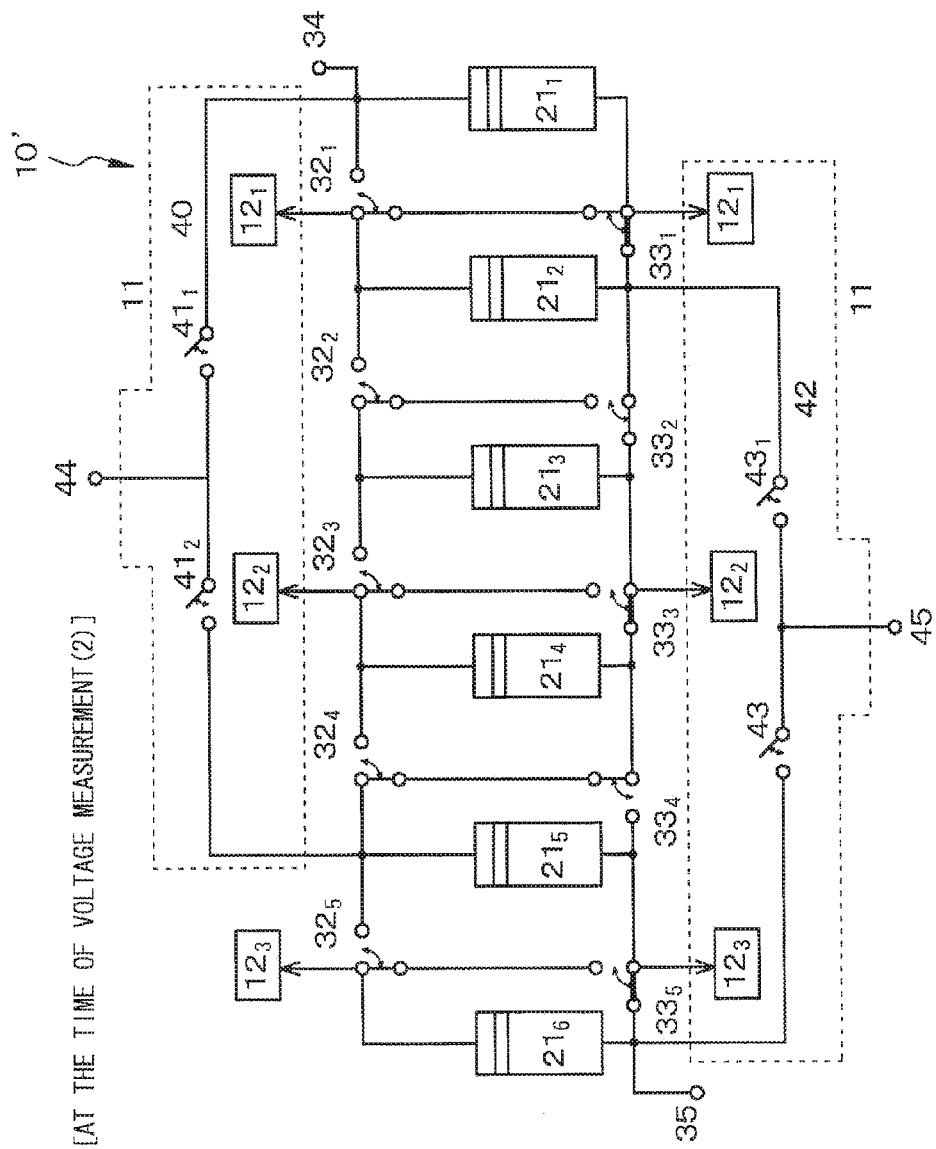
FIG. 7 is a conceptual diagram for explaining the operation of the battery pack of Example 2 following FIG. 6.

Next, as illustrated in a conceptual diagram of FIG. 7, while the charging switches $41_1$, $41_2$, $43_1$, and $43_2$ are kept in the "closed state," the first parallel-serial switching devices $32_1$, $32_3$, and $32_5$ are returned to the "series mode," and the second parallel-serial switching devices $33_1$, $33_3$, and $33_5$ are switched to the "parallel mode." Thereby, OCVs of the even-numbered secondary battery cells $21_2$, $21_4$, and $21_6$ are allowed to be measured by the voltage measurement devices $12_1$ to $12_3$ included in the control circuit 11. The measured values of the even-numbered secondary battery cells $21_2$, $21_4$, and $21_6$ are stored in the memory device included in the control circuit 11.

[Operation-210]

Figure 8:
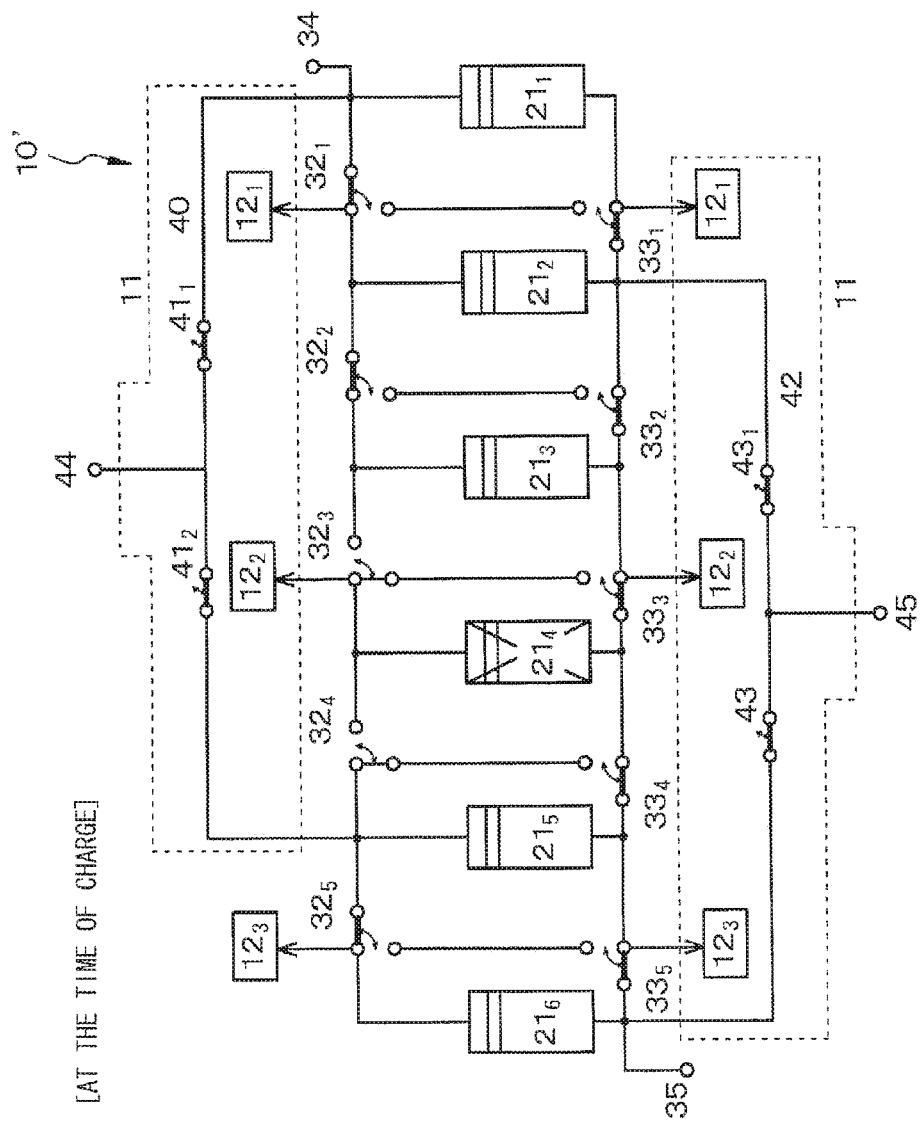
FIG. 8 is a conceptual diagram for explaining the operation of the battery pack of Example 2 following FIG. 7.

As illustrated in a conceptual diagram of FIG. 8, in a state that a secondary battery cell having a measured voltage value equal to or less than the predetermined value as an abnormal-state secondary battery cell is electrically disconnected from the other secondary battery cells, the other secondary battery cells are connected in parallel and are charged through the input terminals 44 and 45. Specifically, the control circuit 11 determines a secondary battery cell having a measured voltage value equal to or less than the predetermined value (the predetermined voltage value in the battery pack according to the first embodiment of the present disclosure and the like. A value obtained by subtracting 0.1 volts from the final discharge voltage, and more specifically, 2.4 volts obtained by subtracting 0.1 volts from the final discharge voltage of 2.5 volts) as an abnormal-state secondary battery cell. Subsequently, the abnormal-state secondary battery cell is electrically disconnected from the other secondary battery cells, and the other secondary battery cells are connected in parallel and are charged.

For example, a description will be given on the assumption that the fourth secondary battery cell $21_4$ is an abnormal-state secondary battery cell. In this case, under the control of the control circuit 11, the charging switches $41_1$, $41_2$, $43_1$, and $43_2$ are switched to the "closed state." In addition thereto, while the first parallel-serial switching devices $32_3$ and $32_4$ are kept in the "series mode," the first parallel-serial switching devices $32_1$, $32_2$, and $32_5$ are switched to the "parallel mode," and the second parallel-serial switching devices $33_1$ to $33_5$ are switched to the "parallel mode." Thereby, the abnormal-state secondary battery cell $21_4$ is allowed to be electrically disconnected from the other secondary battery cells. Thereafter, the secondary battery cells $21_1$ to $21_3$ and $21_5$ to $21_6$ are charged based on a known method.

[Operation-220]

Next, as in the conceptual diagram of FIG. 5, after the secondary battery cells 21 are completely charged, the first parallel-serial switching devices $32_1$ to $32_5$ and the second parallel-serial switching devices $33_1$ to $33_5$ are switched to the "series mode," and the charging switches $41_1$, $41_2$, $43_1$, and $43_2$ are switched to the "open state." Accordingly, discharge is performed through the output terminals 34 and 35 in a state that the abnormal-state secondary battery cell $21_4$ is connected in series with the other secondary battery cells $21_1$ to $21_3$ and $21_5$ to $21_6$.

As described above, in Example 2, with respect to the six (N=6) secondary battery cells 21, the five (=N−1) first parallel-serial switching devices 32, the five (=N−1) second parallel-serial switching devices 33, and the four charging switches $41_1$, $41_2$, $43_1$, and $43_2$ configure a parallel-serial switching mechanism (system) of the secondary battery cells in the battery pack 10'. That is, compared to in Example 1, the number of the switching devices is allowed to be reduced by two.

Figure 9:
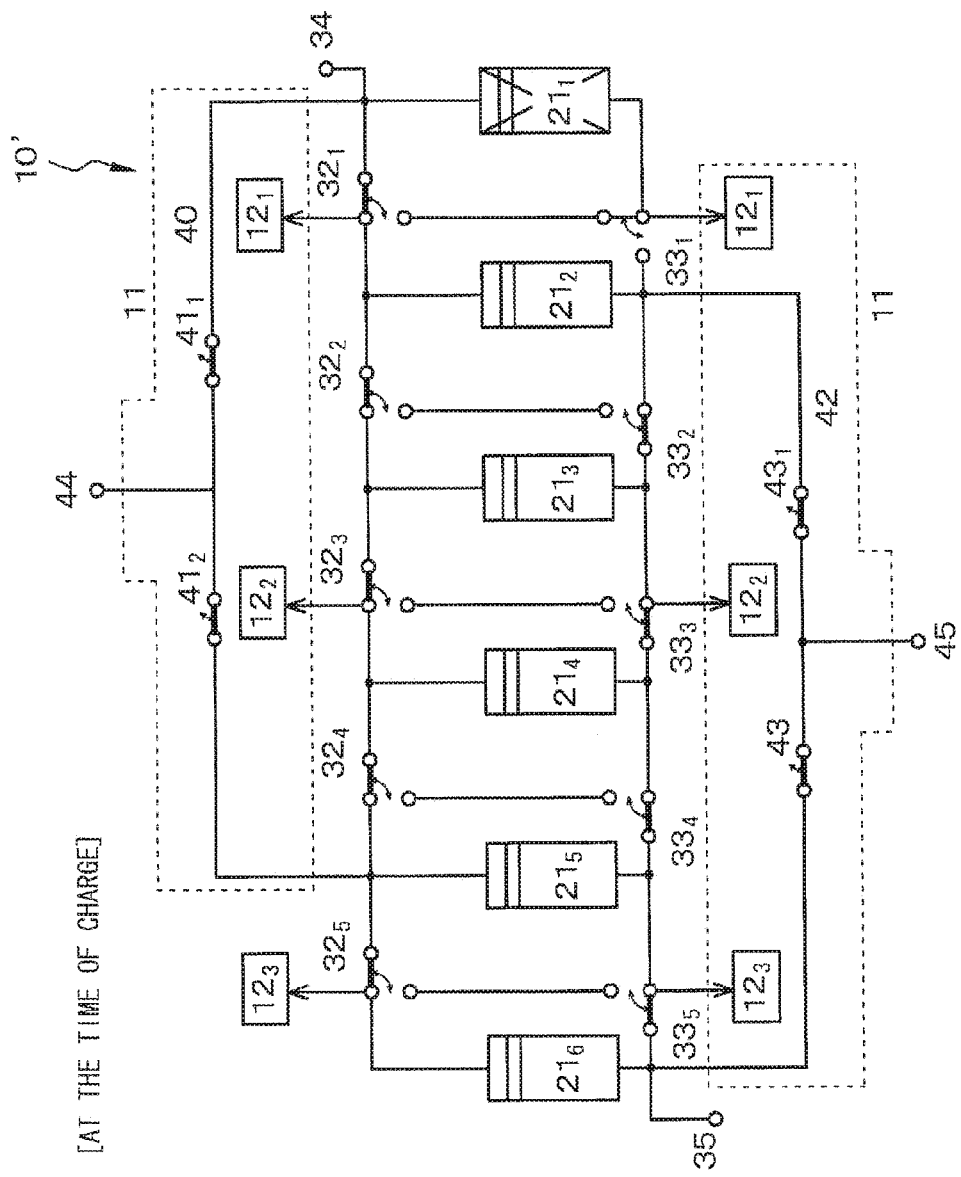
FIG. 9 is a conceptual diagram illustrating a state of charging switches, first parallel-serial switching devices, and second parallel-serial switching devices in the case where a first secondary battery cell is an abnormal-state secondary battery cell in the battery pack of Example 2.
Figure 10:
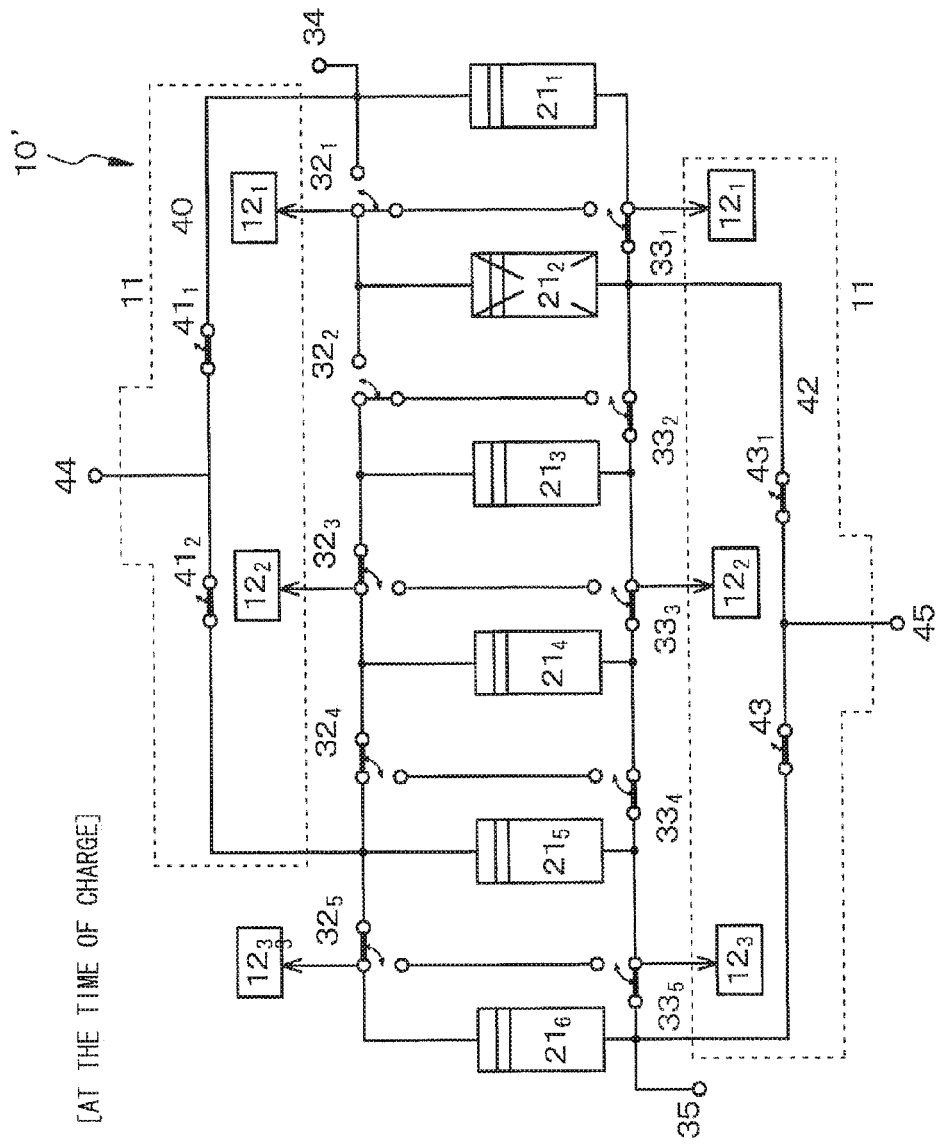
FIG. 10 is a conceptual diagram illustrating a state of the charging switches, the first parallel-serial switching devices, and the second parallel-serial switching devices in the case where a second secondary battery cell is an abnormal-state secondary battery cell in the battery pack of Example 2.
Figure 11:
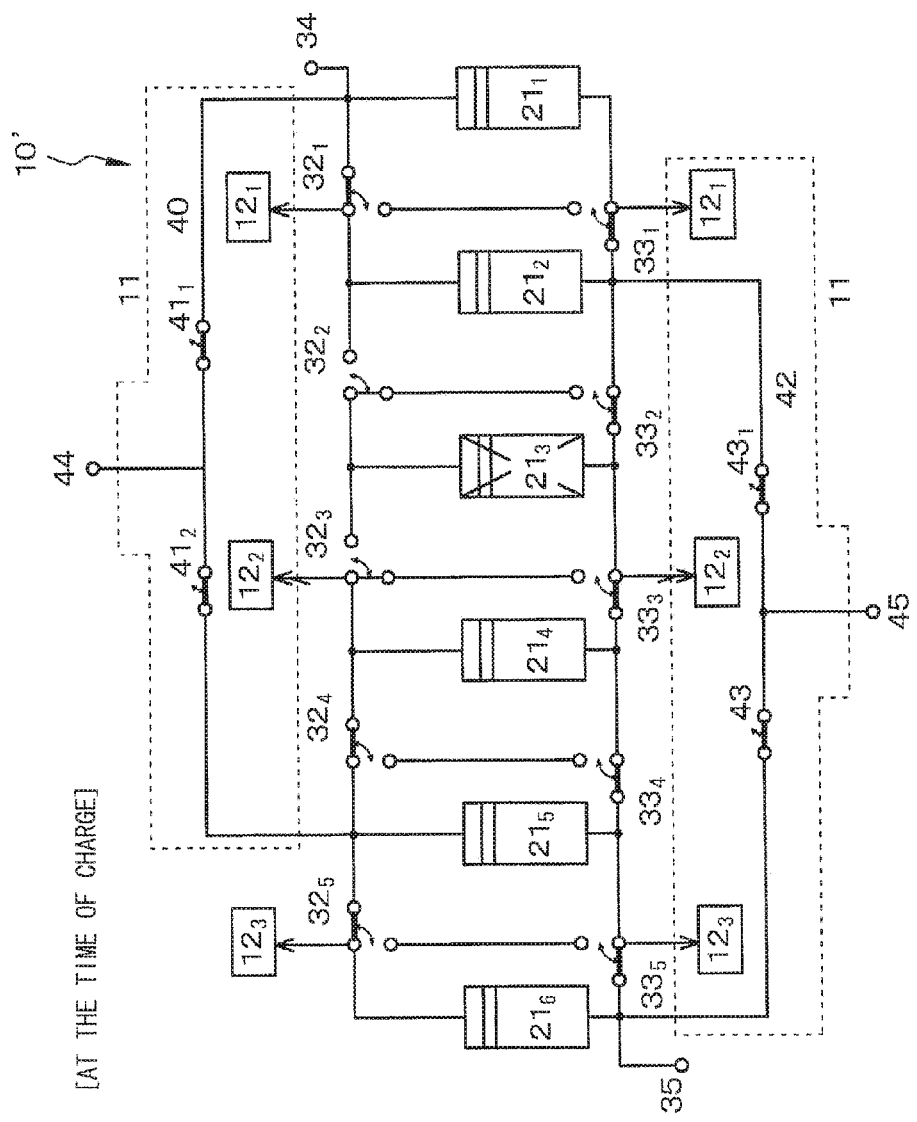
FIG. 11 is a conceptual diagram illustrating a state of the charging switches, the first parallel-serial switching devices, and the second parallel-serial switching devices in the case where a third secondary battery cell is an abnormal-state secondary battery cell in the battery pack of Example 2.
Figure 12:
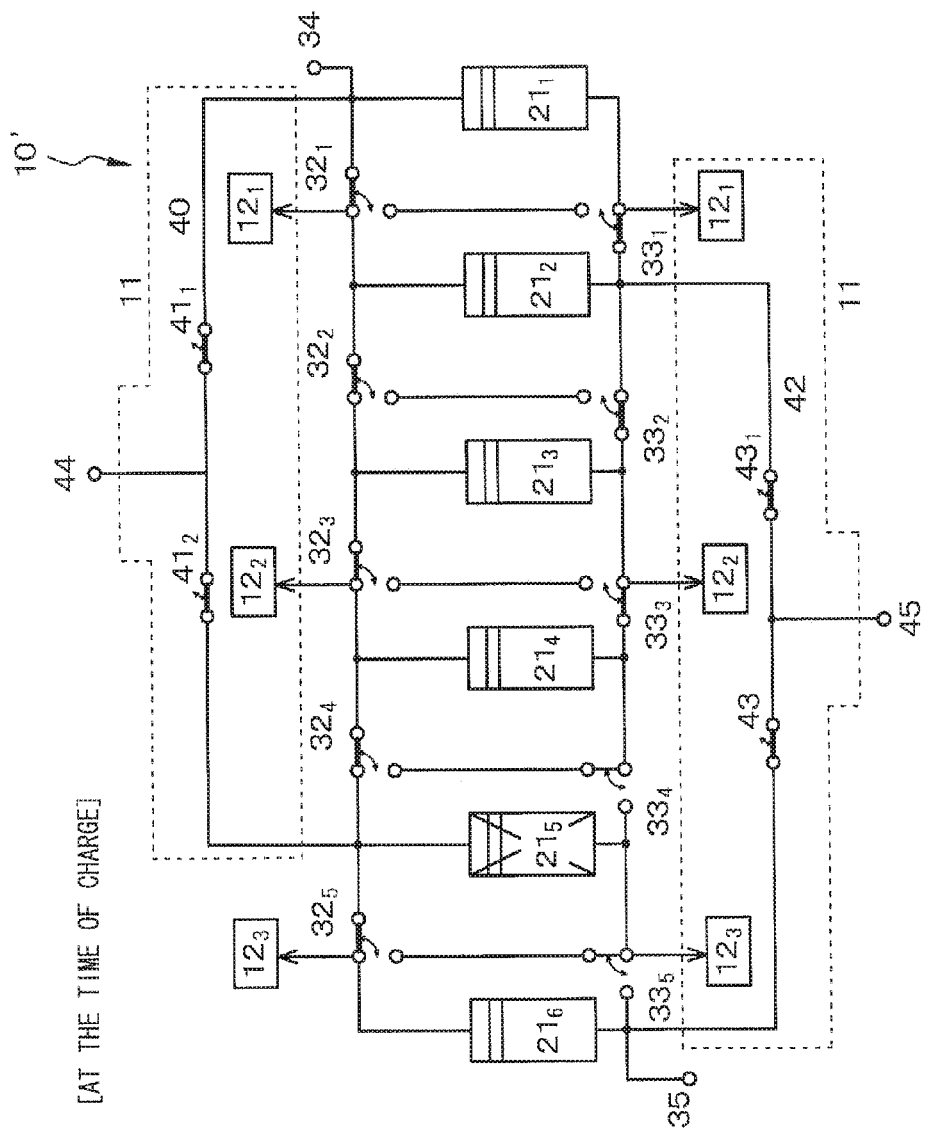
FIG. 12 is a conceptual diagram illustrating a state of the charging switches, the first parallel-serial switching devices, and the second parallel-serial switching devices in the case where a fifth secondary battery cell is an abnormal-state secondary battery cell in the battery pack of Example 2.
Figure 13:
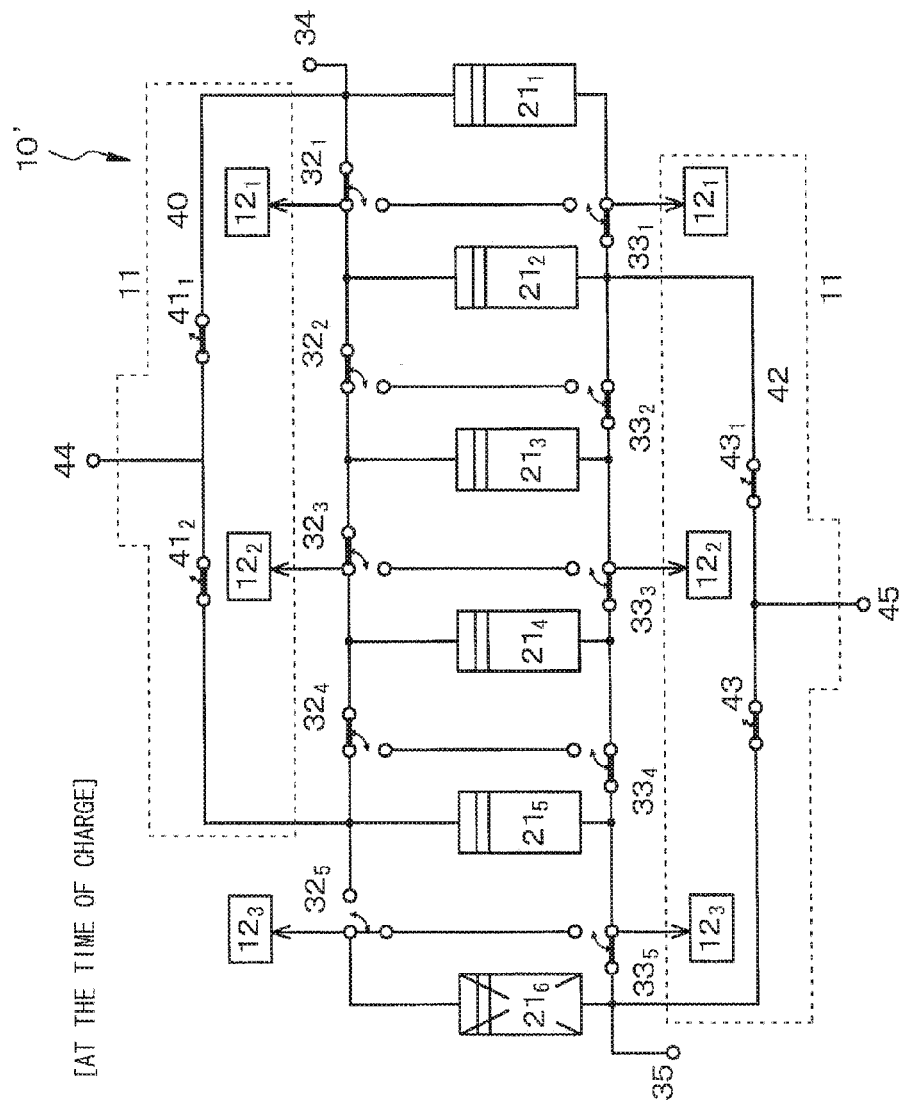
FIG. 13 is a conceptual diagram illustrating a state of the charging switches, the first parallel-serial switching devices, and the second parallel-serial switching devices in the case where a sixth secondary battery cell is an abnormal-state secondary battery cell in the battery pack of Example 2.

FIG. 9 illustrates a state of the charging switches $41_1$, $41_2$, $43_1$, and $43_2$, the first parallel-serial switching devices $32_1$ to $32_5$, and the second parallel-serial switching devices $33_1$ to $33_5$ in the case where the first secondary battery cell $21_1$ is an abnormal-state secondary battery cell. Further, FIG. 10 illustrates a state of the charging switches $41_1$, $41_2$, $43_1$, and $43_2$, the first parallel-serial switching devices $32_1$ to $32_5$, and the second parallel-serial switching devices $33_1$ to $33_5$ in the case where the second secondary battery cell $21_2$ is an abnormal-state secondary battery cell. Further, FIG. 11 illustrates a state of the charging switches $41_1$, $41_2$, $43_1$, and $43_2$, the first parallel-serial switching devices $32_1$ to $32_5$, and the second parallel-serial switching devices $33_1$ to $33_5$ in the case where the third secondary battery cell $21_3$ is an abnormal-state secondary battery cell. Further, FIG. 12 illustrates a state of the charging switches $41_1$, $41_2$, $43_1$, and $43_2$, the first parallel-serial switching devices $32_1$ to $32_5$, and the second parallel-serial switching devices $33_1$ to $33_5$ in the case where the fifth secondary battery cell $21_5$ is an abnormal-state secondary battery cell. Further, FIG. 13 illustrates a state of the charging switches $41_1$, $41_2$, $43_1$, and $43_2$, the first parallel-serial switching devices $32_1$ to $32_5$, and the second parallel-serial switching devices $33_1$ to $33_5$ in the case where the sixth secondary battery cell $21_6$ is an abnormal-state secondary battery cell.

The states of the first parallel-serial switching devices $32_1$ to $32_5$ and the second parallel-serial switching devices $33_1$ to $33_5$ illustrated in FIG. 8 to FIG. 13 are summarized as follows.

[1] In the case where the first secondary battery cell $21_1$ is an abnormal-state secondary battery cell
First parallel-serial switching devices $32_1$ to $32_{(N-1)}$: "parallel mode"
Second parallel-serial switching devices $33_1$: "series mode"
Second parallel-serial switching devices $33_2$ to $33_{(N-1)}$: "parallel mode"

[2] In the case where the n-th (2≤n≤(N−2)) secondary battery cell $21_n$ is an abnormal-state secondary battery cell
First parallel-serial switching devices $32_{(n-1)}$ to $32_n$: "series mode"

Other first parallel-serial switching devices 32: "parallel mode"
Second parallel-serial switching devices $33_1$ to $33_{(N-1)}$: "parallel mode"
[3] In the case where the (N−1)th secondary battery cell $21_{(N-1)}$ is an abnormal-state secondary battery cell
First parallel-serial switching devices $32_1$ to $32_{(N-1)}$: "parallel mode"
Second parallel-serial switching devices $33_1$ to $33_{(N-3)}$: "parallel mode"
Second parallel-serial switching devices $33_{(N-2)}$ to $33_{(N-1)}$: "series mode"
[4] In the case where the Nth secondary battery cell $21_N$ is an abnormal-state secondary battery cell
First parallel-serial switching devices $32_1$ to $32_{(N-2)}$: "parallel mode"
First parallel-serial switching device $32_{(N-1)}$: "series mode"
Second parallel-serial switching devices $33_1$ to $33_{(N-1)}$: "parallel mode"

However, the operations of the first parallel-serial switching devices and the second parallel-serial switching devices are not limited to the foregoing summary, and may be as follows:
[5] In the case where the n'-th (3≤n'≤(N−2)) secondary battery cell $21_{n'}$ is an abnormal-state secondary battery cell
First parallel-serial switching devices $32_1$ to $32_{(N-1)}$: "parallel mode"
Second parallel-serial switching devices $33_{(n'-1)}$ to $33_{n'}$: "series mode"
Other second parallel-serial switching devices 33: "parallel mode"

Figure 14:
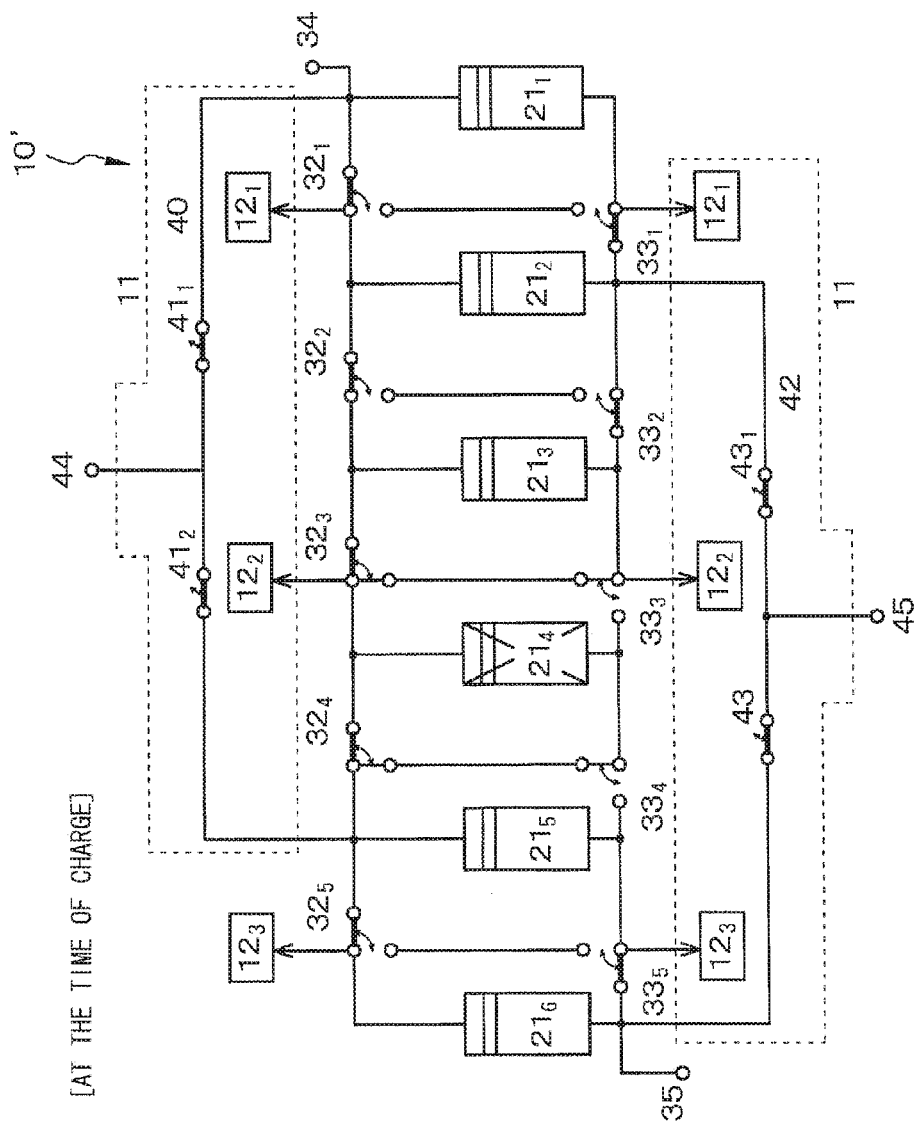
FIG. 14 is a conceptual diagram illustrating a state of a modification of the charging switches, the first parallel-serial switching devices, and the second parallel-serial switching devices in the case where a fourth secondary battery cell is an abnormal-state secondary battery cell in the battery pack of Example 2.

FIG. 14 illustrates a state of the charging switches $41_1$, $41_2$, $43_1$, and $43_2$, the first parallel-serial switching devices $32_1$ to $32_5$, and the second parallel-serial switching devices $33_1$ to $33_5$ in the case where the fourth secondary battery cell $21_1$ is an abnormal-state secondary battery cell.

Example 3

Example 3 relates to the battery pack according to the second embodiment of the present disclosure and the electric power consuming apparatus including the battery pack. In the battery pack of Example 3, the control circuit 11 measures voltages of the respective secondary battery cells 21 every time when discharge is discontinued. The measured voltage values are stored in a memory device included in the control circuit 11. The latest measured voltage values are stored in the memory device. Measurement of the voltages of the respective secondary battery cells 21 may be substantially performed based on an operation similar to [Operation-100] described in Example 1.

In a state that a secondary battery cell having a measured and stored voltage value equal to or less than the predetermined value as an abnormal-state secondary battery cell is electrically disconnected from the other secondary battery cells, the control circuit 11 connects the other secondary battery cells in parallel and charges the other secondary battery cells. That is, the control circuit 11 reads out the measured voltage value stored in the memory device, and determines a secondary battery cell having a measured voltage value equal to or less than the predetermined value (the predetermined voltage value in the battery pack according to the second embodiment of the present disclosure and the like. Specifically, 3.5 volts obtained by subtracting 0.2 volts from the nominal voltage of 3.7 volts) as an abnormal-state secondary battery cell. Subsequently, as in Example 1 or Example 2, that is, for example, based on an operation similar to [Operation-110] described in Example 1, the abnormal-state secondary battery cell is electrically disconnected from the other secondary battery cells. The other secondary battery cells are connected in parallel and are charged. In some cases, as the predetermined voltage value in the battery pack according to the second aspect of the present disclosure and the like, a predetermined voltage value based on the discharge final voltage (specifically, 2.4 volts obtained by subtracting 0.1 volts from the discharge final voltage of 2.5 volts) may be adopted.

After the secondary battery cells 21 are completely charged, for example, as in [Operation-120] of Example 1, the control circuit 11 performs discharge in a state that the abnormal-state secondary battery cell is connected in series with the other secondary battery cells.

A method of charging and discharging a battery pack using the battery pack of Example 3 is a method of charging and discharging a battery pack including a plurality of secondary battery cells; and a control circuit, wherein, under control of the control circuit, the plurality of secondary battery cells are connected in series at time of discharge, and are connected in parallel at time of charge. Under the control of the control circuit, voltages of the respective secondary battery cells are measured every time when the discharge is discontinued, and the measured voltages in a memory device included in the control circuit, and, in a state that a secondary battery cell having a value of the measured and stored voltage equal to or less than a predetermined value as an abnormal-state secondary battery cell is electrically disconnected from other secondary battery cells in the plurality of secondary battery cells, the other secondary battery cells are connected in parallel and are charged.

In the battery pack of Example 3 or the electric power consuming apparatus including the battery pack, while the secondary battery cells are connected in series at the time of discharge, the control circuit measures voltages of the respective secondary battery cells every time when discharge is discontinued, and the measured voltages are stored in the memory device included in the control circuit. At the time of charge, in a state that a secondary battery cell having a measured and stored voltage value equal to or less than the predetermined value as an abnormal-state secondary battery cell is electrically disconnected from the other secondary battery cells, the other secondary battery cells are connected in parallel. Therefore, when the respective secondary battery cells are connected in parallel at the time of charge, a large current is allowed to be prevented from flowing all together from the other normal secondary battery cells to the abnormal-state secondary battery cell. Further, since the secondary battery cells including the abnormal-state secondary battery cell are connected in series at the time of discharge, the total voltage is decreased only by an amount of the abnormal-state secondary battery cell compared to that in the normal state. If heat is generated when applying a current to the abnormal-state secondary battery cell, such an incident is detected before charge and the battery pack is in an unusable state, which substantially does not lead to a serious problem Example 4

Example 4 relates to the battery pack according to the third embodiment of the present disclosure and the electric power consuming apparatus including the battery pack.

In the case where an abnormal-state secondary battery cell retains a certain level of OCV, in some cases, it is difficult to detect the abnormal state of the secondary battery cell in Example 1 to Example 3. That is, in the case where remaining capacities of the respective secondary battery cells are lowered, the OCVs are lowered, and therefore, in some cases, it is difficult to distinguish between the abnormal-state secondary battery cell and the normal secondary battery cells. In another case, in the case where a battery pack has not been used for a long time, and all secondary battery cells have been completely discharged, it is not possible to distinguish between an abnormal-state secondary battery cell and normal secondary battery cells. In these cases, a battery pack having a configuration and a structure of Example 4 may be adopted.

In the battery pack of Example 4, the control circuit 11 charges each of the secondary battery cells 21 connected in series until each electric power amount reaches the predetermined value. That is, the control circuit 11 performs charge until each capacity reaches a capacity at which each voltage is expected to reach a certain voltage (a voltage exceeding the first predetermined value). Alternatively, since it is possible to previously estimate an electric power amount necessary from a state that each of the secondary battery cells is completely discharged until when each voltage reaches a voltage exceeding the first predetermined value for each type of the secondary battery cells, the control circuit 11 charges each of the secondary battery cells with an electric power amount at which each voltage is expected to exceed the first predetermined value. Subsequently, the control circuit 11 measures a voltage (specifically, for example, an OCV) of the secondary battery cells 21 connected in series. In the case where the measured voltage value of the secondary battery cells 21 connected in series exceeds the first predetermined value, the control circuit 11 switches connection of the secondary battery cells 21 to parallel connection, performs charge of the secondary battery cells 21, and completes the charge. In this case, the predetermined electric power amount is set as 1.8 watt-hour, and the first predetermined value is set as 3.5 volts.

Specifically, the control circuit 11 measures voltages of the secondary battery cells 21 connected in series, and a voltage (OCV) of both ends of the second battery cell unit 20 that is a voltage of both ends of the secondary battery cell unit 20 that is a measured value while the disconnection switching devices $31_1$ to $31_6$ are kept in the "closed state," and the first parallel-serial switching devices $32_1$ to $32_5$ and the second parallel-serial switching devices $33_1$ to $33_5$ are kept in the "series mode." In the case where the measured voltage value exceeds the first predetermined value, the control circuit 11 determines that no abnormal state occurs in the secondary battery cells 21, and switches the first parallel-serial switching devices $32_1$ to $32_5$ and the second parallel-serial switching devices $33_1$ to $33_5$ from the "series mode" to the "parallel mode" while the disconnection switching devices $31_1$ to $31_6$ are kept in the "closed state." Thereafter, the secondary battery cells $21_1$ to $21_6$ are charged based on a known method.

In contrast, in the case where the measured voltage value of the secondary battery cells 21 connected in series is equal to or less than the first predetermined value, the control circuit 11 determines that an abnormal state occurs in any of the secondary battery cells, and measures voltages (OCVs) of the respective secondary battery cells 21. In a state that a secondary battery cell 21 having a measured voltage value equal to or less than the second predetermined value as an abnormal-state secondary battery cell is electrically disconnected from the other secondary battery cells 21, the other secondary battery cells 21 are charged in parallel, and charge is completed. Specifically, as in Example 1 or Example 2, that is, for example, based on an operation similar to [Operation-110] described in Example 1, the abnormal-state secondary battery cell is electrically disconnected from the other secondary battery cells. Subsequently, the other secondary battery cells are connected in parallel and are charged. In this case, the second predetermined value is set as 3.3 volts.

After the secondary battery cells 21 are completely charged, for example, as in [Operation-120] of Example 1, the control circuit 11 performs discharge in a state that the abnormal-state secondary battery cell is connected in series with the other secondary battery cells.

A method of charging and discharging a battery pack using the battery pack of Example 4 is a method of charging and discharging a battery pack including: a plurality of secondary battery cells; and a control circuit, wherein, under control of the control circuit, the plurality of secondary battery cells are connected in series at time of discharge, and are connected in parallel at time of charge. Under the control of the control circuit, the secondary battery cells are connected in series and are charged until each electric power amount thereof reaches a predetermined electric power amount, and subsequently a voltage of the secondary battery cells connected in series are measured. When a value of the measured voltage of the secondary battery cells connected in series exceeds a first predetermined value, connection of the secondary battery cells is switched to parallel connection, the secondary battery cells are charged, and the charge is completed. When the value of the measured voltage of the secondary battery cells connected in series is equal to or less than the first predetermined value, voltages of the respective secondary battery cells are measured, and, in a state that a secondary battery cell having the value of the measured voltage equal to or less than a second predetermined value as an abnormal-state secondary battery cell is electrically disconnected from other secondary battery cells in the plurality of secondary battery cells, the other secondary battery cells are connected in parallel, the other secondary battery cells are charged, and the charge is completed.

In the battery pack of Example 4 or the electric power consuming apparatus including the battery pack, at the time of discharge, the secondary battery cells are connected in series. In contrast, at the time of charge, in a state that an abnormal-state secondary battery cell is electrically disconnected from the other secondary battery cells, the other secondary battery cells are connected in parallel by the control circuit. Therefore, when the respective secondary battery cells are connected in parallel at the time of charge, a large current is allowed to be prevented from flowing all together from the other normal secondary battery cells to the abnormal-state secondary battery cell. Further, since the secondary battery cells including the abnormal-state secondary battery cell are connected in series at the time of discharge, the total voltage is decreased only by an amount of the abnormal-state secondary battery cell compared to that in the normal state. If heat is generated when applying a current to the abnormal-state secondary battery cell, such an incident is detected before charge and the battery pack is in an unusable state, which does not lead to serious problem. Further, even if an abnormal-state secondary battery cell retains a certain level of OCV, or even if a battery pack has not been used for a long time, and all secondary battery cells have been completely discharged, the abnormal state of the secondary battery cell is allowed to be surely detected.

It is to be noted that the configuration and the structure of the battery pack and the method of charging and discharging the battery pack that are described in Example 4 may be combined with the configurations and the structures of the battery packs and the methods of charging and discharging the battery packs that are described in Example 1 to Example 3.

The present disclosure has been described above with reference to the preferred examples. However, the present disclosure is not limited to the foregoing examples. The configurations, the structures, the connection relations, and the like of the battery packs described in the examples are merely exemplifications, and may be changed as appropriate.

Controlling of the disconnection switching devices $31_1$ to $31_6$, the first parallel-serial switching devices $32_1$ to $32_5$, and the second parallel-serial switching devices $33_1$ to $33_5$ by the control circuit 11 may be performed with wires or without wires. Further, in examples, the secondary battery cells and the voltage measurement devices are connected by the wirings. However, alternatively, IC chips including wireless devices and voltage measurement devices may be arranged in the secondary battery cells, and measured voltage results in the secondary battery cells may be sent to the control circuit 11 without wires.

Further, an abnormal-state detection circuit (such as an abnormal-state detection circuit configured of a resistor and an analog-to-digital converter (ADC)) that detects an abnormal state of a secondary battery cell may be provided in the control circuit 11. The abnormal-state detection circuit is connected to the secondary battery cells 21. In the case where an abnormal state occurs in a current flowing in the abnormal-state detection circuit, a fact that an abnormal state occurs in a secondary battery cell is allowed to be known.

In general, in an abnormal-state secondary battery cell in which internal short-circuit occurs, heat is often generated. Therefore, presence or absence of an abnormal state of a secondary battery cell is allowed to be detected based on a measurement result of temperature of the secondary battery cell. Specifically, the following method may be adopted. In the method, for example, IC chips including temperature detection means (such as temperature detection means that have pn-junctions and measure temperature based on temperature dependability of electric resistance values of the pn-junctions) are adhered to outer surfaces of the secondary battery cells, or such IC chips are arranged in the secondary battery cells. Temperature information measured by the IC chips may be sent to, for example, the control circuit 11 with wires or without wires.

The invention claimed is:

1. A battery pack comprising:
a plurality of secondary battery cells; and
a control circuit, wherein
under control of the control circuit, the plurality of secondary battery cells are connected in series at time of discharge,
the control circuit connects the secondary battery cells in series and charges the secondary battery cells until each electric power amount thereof reaches a predetermined electric power amount, and subsequently measures a voltage of the secondary battery cells connected in series,
when a value of the measured voltage of the secondary battery cells connected in series exceeds a first predetermined value, the control circuit switches connection of the secondary battery cells to parallel connection, charges the secondary battery cells, and completes the charge, and
when the value of the measured voltage of the secondary battery cells connected in series is equal to or less than the first predetermined value, the control circuit measures voltages of the respective secondary battery cells, and in a state that a secondary battery cell having the value of the measured voltage equal to or less than a second predetermined value as an abnormal-state secondary battery cell is electrically disconnected from other secondary battery cells in the plurality of secondary battery cells, the control circuit connects the other secondary battery cells in parallel, charges the other secondary battery cells, and completes the charge.

2. The battery pack according to claim 1, wherein the control circuit discharges the secondary battery cells in a state that the abnormal-state secondary battery cell is connected in series with the other secondary battery cells.

3. An electric power consuming apparatus comprising the battery pack according to claim 1.

4. An electric power consuming apparatus comprising the battery pack according to claim 2.

5. The battery pack according to claim 1, wherein the control circuit includes a voltage measurement device.

6. The battery pack according to claim 1, wherein the control circuit includes a charge and discharge control circuit.

7. The battery pack according to claim 6, wherein the charge and discharge control circuit includes a battery protection circuit.

8. The battery pack according to claim 1, wherein a switching device is arranged between the control circuit and each of the secondary battery cells.

9. The battery pack according to claim 1, wherein the predetermined electric power amount is 80% or less than a capacity of each of the secondary battery cells.

10. The battery pack according to claim 1, wherein the first predetermined value is obtained by subtracting a value from 0.05 volts to 0.2 volts both inclusive from a product of a value obtained by adding a voltage measurement error to a nominal voltage and the number of the secondary battery cells in series.

11. The battery pack according to claim 1, wherein the second predetermined value is obtained by subtracting a value from 0.05 volts to 0.5 volts both inclusive from a nominal voltage.

* * * * *